United States Patent
Kalaiselvi et al.

(10) Patent No.: US 10,224,539 B2
(45) Date of Patent: Mar. 5, 2019

(54) SURFACE MODIFIED CATHODE WITH IMPROVED LITHIUM INTERCALATION BEHAVIOR

(71) Applicant: COUNCIL OF SCIENTIFIC AND INDUSTRIAL RESEARCH, New Delhi (IN)

(72) Inventors: Nallathamby Kalaiselvi, Karaikudi (IN); Dharmarajan Bhuvaneswari, Karaikudi (IN); Ganguli Babu, Karaikudi (IN)

(73) Assignee: COUNCIL OF SCIENTIFIC AND INDUSTRIAL RESEARCH, New Delhi (IN)

( * ) Notice: Subject to any disclaimer, the term of this patent is extended or adjusted under 35 U.S.C. 154(b) by 97 days.

(21) Appl. No.: 14/453,926

(22) Filed: Aug. 7, 2014

(65) Prior Publication Data
US 2016/0043387 A1 Feb. 11, 2016

(51) Int. Cl.
*H01M 4/36* (2006.01)
*H01M 4/505* (2010.01)
(Continued)

(52) U.S. Cl.
CPC ........... *H01M 4/366* (2013.01); *H01M 4/483* (2013.01); *H01M 4/505* (2013.01); *H01M 4/525* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 7,678,503 B2 | 3/2010 | Manthiram et al. | |
| 2008/0248391 A1* | 10/2008 | Wakasugi | B82Y 30/00 429/223 |
| 2010/0151331 A1* | 6/2010 | Sun | H01M 4/1391 429/231.95 |

OTHER PUBLICATIONS

Riley et al. Journal of Power Sources 196 2011 3317-3324 (Nov. 2010).*

(Continued)

*Primary Examiner* — Wojciech Haske
(74) *Attorney, Agent, or Firm* — Hunton Andrews Kurth LLP (57) ABSTRACT

Surface modification of $LiNi_{0.4}Mn_{0.4}Co_{0.2}O_2$ (442) compound with certain inert ($M_xO_y$) metal oxides viz., $Al_2O_3$, $Bi_2O_3$, $In_2O_3$, $Cr_2O_3$, $ZrO_2$, $ZnO$, $MgO$ has been attempted with a view to improve the structural and cycling stability, especially upon high voltage and high rate cycling conditions. In addition to HF scavenging effect, the protective metal oxide inter-connect layer restricts the number of oxide ion vacancies eliminated during the initial cycling of cathode, resulting in the reduced irreversible capacity loss of the first cycle. Among the surface modified cathodes, $Bi_2O_3$ coated $LiNi_{0.4}Mn_{0.4}Co_{0.2}O_2$ cathode exhibits appreciable specific capacity values of 196 ($Q_{dc1}$) and 175 ($Q_{dc100}$) mAh $g^{-1}$ with 89% capacity retention, thus evidencing the superiority of $Bi_2O_3$ modifier in improving the electrochemical behavior of pristine $LiNi_{0.4}Mn_{0.4}Co_{0.2}O_2$ cathode. Further, suitability of $Bi_2O_3$ coated $LiNi_{0.4}Mn_{0.4}Co_{0.2}O_2$ cathode for high voltage (5.0 V) and high rate (3 C) lithium intercalation and de-intercalation applications has been demonstrated up to 100 cycles.

14 Claims, 8 Drawing Sheets

(51) Int. Cl.
*H01M 4/525* (2010.01)
*H01M 4/48* (2010.01)
*H01M 10/0525* (2010.01)

(56) References Cited

OTHER PUBLICATIONS

Ban, C., et al., Extremely Durable High-Rate Capability of a LiNi0.4Mn0.4Co0.2O2 Cathode Enabled with Single-Walled Carbon Nanotubes, Adv. Energy Mater, 2011, 1, pp. 58-62.

Cho, J., et al., Improvement of Structural Stability of LiCoO2 Cathode during Electrochemical Cycling by Sol-Gel coating of SnO2, Electrochemical and Solid-State Letters, 2000, 3 (8), pp. 362-365.

Kannan, A.M., et al., Surface/Chemically Modified LiMn2o4 Cathodes for Lighium0Ion Batteries, Electrochemical and Solid-State Letters, 2002, 5 (7), pp. A167-A169.

Liu, J, et al, Functional surface modifications of a high capacity layered Li[Li0.2Mn0.54Ni0.13Co0.13]O2 cathode, J. Mater. Chem., 2010, 20, pp. 3961-3967.

Jung, Y.S., et al., Enhanced Stability of LiCoO2 Cathodes in Lithium-Ion Batteries Using Surface Modification by Atomic Layer Deposition, Journal of the Electrochemical Society, 2010, 157, 1, pp. A75-A81.

Kim, Youngsik, et al, Synthesis and electrochemical characteristics of Al2O3-coated LiNi1/3Co1/3Mn1/3O2 cathode materials for lithium ion batteries, Electrochimica Acta, 2006, 52, pp. 1316-1322.

Li, Z., et al, Comparative Study of the Capacity and Rate Capability of LiNiyMnyCo1-2yO2 (y50.5, 0.45, 0.4, 0.33), Journal of the Electrochemical Society, 2011, 158 (5), pp. A516-A522.

Gangulibabu, et al., Comparison of corn starch-assisted sol-gel and combustion methods to prepare LiMnxCoyNizO2 compounds, J Solid State Electrochem, 2013, 17, pp. 9-17.

\* cited by examiner

SURFACE MODIFIED CATHODE WITH IMPROVED LITHIUM INTERCALATION BEHAVIOR

FIELD OF THE INVENTION

The present invention relates to surface modified $LiNi_{0.4}Mn_{0.4}Co_{0.2}O_2$ cathode (442) with improved lithium intercalation behaviour. Particularly, the surface of layered lithium intercalating cathode materials having a composition of $LiNi_{0.4}Mn_{0.4}Co_{0.2}O_2$ (442) that belongs to a solid solution series of $LiNi_yMn_yCo_{1-2y}O_2$ has been surface modified by $M_xO_y$ type of metal oxides to improve the electrochemical properties, with a special relevance to specific capacity, capacity retention, rate capability and coulombic efficiency.

BACKGROUND AND PRIOR ART OF THE INVENTION

Lithium batteries serve as popular and potential power sources for portable electronic devices, Hybrid Electric Vehicle (HEV) and Plugged in Hybrid Electric Vehicles (PHEVs). Among the promising cathode candidates that are widely used in rechargeable lithium batteries, mixed metal oxide cathodes assume greater importance due to advantages such as high voltage, high capacity and structural stability. In this regard, candidates viz., $LiNi_{0.5}Mn_{0.5}O_2$ (552), $LiNi_{0.33}Mn_{0.33}Co_{0.33}O_2$ (333) and $LiNi_{0.4}Mn_{0.4}Co_{0.2}O_2$ (442) are considered as potential cathode materials, wherein synergistic effect of individual transition metal cations that improves the electrochemical behavior of such solid solution cathodes. Here again, solid solution consisting of cobalt is found to offer better lattice ordering, which is responsible for improved cyclability and extended electrochemical window possibilities. Among the high voltage cathodes, the less studied $LiNi_{0.4}Mn_{0.4}Co_{0.2}O_2$ cathode has been chosen for the present study.

Surface coating has been proven to be effective for improving the capacity retention, rate capability and even thermal stability of cathode materials for lithium-ion batteries. To date, few additives have been reported to provide a protective passivation film for cathodes. Alternatively, surface coating has been reported to extend the performance of cathode materials by either changing the surface chemistry or by protecting the surface by undesirable side reactions. The coating materials investigated to date include carbon, metal oxides, metal carbonates metal aluminates, metal phosphates, metal fluorides, metal oxyfluorides, metal hydroxides and $Li_2O.2B_2O_3$ glass, as well as cathode materials with lower reactivity towards non-aqueous electrolytes. However, the title compound has been studied only for its surface modification with CNT and no other additives.

Reference may be made C. Ban, Z. li, Z. Wu, M. J. Kirkham, Le Chen, Y. S. Jung, E. A. Payzant, Y. Yan, M. S. Whittingham, and A. C. Dillon, Adv. Energy Mater. 1 (2011) 58-62 wherein $LiNi_{0.4}Mn_{0.4}Co_{0.2}O_2$ (95 wt. %) and Single Wall Carbon Nanotubes (SWCNTs) (5 wt. %) were mixed and suspended in deionized water by using a 1% concentration of sodium dodecyl sulfate as the surfactant. The resulting film was rinsed with deionized water before transferring to the Al foil employed as the current collector. The study demonstrated high-rate capability of layered $LiNi_{0.4}Mn_{0.4}Co_{0.2}O_2$ by fabricating an electrode composed of 5 wt. % SWCNTs and 95 wt. % $LiNi_{0.4}Mn_{0.4}Co_{0.2}O_2$. Raman spectroscopy evidences the existence of very strong interaction between the surface of some of the SWCNTs and the surface of $LiNi_{0.4}Mn_{0.4}Co_{0.2}O_2$. This strong surface connectivity ensures the fast diffusion of ions and electrons during cycling, resulting in a sustainable capacity at high rates for extended cycles. The drawbacks are carbon nanotubes (SWCNTs) could be employed as a flexible net, enabling reversible cycling for high volume expansion materials. However, the same is not suitable for cathode material which does not undergo volume expansion. Similarly, materials that suffer from poor electrical conductivity and surface over-charge/over-discharge causing capacity fade, especially at high rate only would require modification using CNT, which is not the case with the currently chosen 442 cathode. Further, SWCNTs are expensive and is too difficult to coat CNT uniformly on Sub-micron particles of such compounds.

Reference may be made to J. Cho, C.-S. Kim, Sang-Im Yoob, Electrochem. Solid-State Lett. 3 (2000) 362, wherein sol-gel coating of $LiCoO_2$ by $SnO_2$ and subsequent heat-treatment at relatively low temperatures of 400 and 500° C. greatly improve the structural stability, retaining 86 and 84% respectively, of their initial capacities after 47 cycles between 4.4 and 2.75 V at the 0.5 C rate. The drawbacks are the voltage window under investigation is very narrow in range of 4.4 and 2.75 V. Here again, 600° C. that shows uniform Sn distribution throughout the particles exhibits undesirable phase transition during cycling, because solid solution is formed due to the high temperature treatment at 600° C. So it is necessary to optimize the coating temperature, which should normally be slightly lower than the solid solution formation temperature.

Reference may be made to A. M. Kannan, A. Manthiram, Electrochem. Solid-State Lett. 5 (2002) A167-A169, wherein surface modification of $LiMn_2O_4$ spinel oxide with $Li_xCoO_2$, $LiNi_{0.5}Co_{0.5}O_2$, $Al_2O_3$, and MgO has been reported using a chemical processing procedure followed by heat-treatment at 300-800° C. The surface/chemically modified samples showed much better capacity retention at both 25 and 60° C. than does the unmodified $LiMn_2O_4$ (~41% fade in 100 cycles at 60° C.). The drawbacks are coating with crystalline cathode material $LiNi_{0.5}Co_{0.5}O_2$ would lead to non uniform coating and partial substitution of one of the metal cations by the added surface modifier. Therefore, it would not serve the purpose of protecting the layer of active material from the undesirable side reactions due to its contact with the electrolyte.

Reference may be made to J. Liu, A. Manthiram, J. Mater. Chem. 20 (2010) 3961, wherein enhanced electrochemical performances of the high capacity layered oxide solid solution $Li[Li_{0.2}Mn_{0.54}Ni_{0.13}Co_{0.13}]O_2$ cathode is reported. Basically, the surface has been modified with 2 wt. % $Al_2O_3$, 2 wt. % $RuO_2$, and 1 wt. % $Al_2O_3$+1 wt. % $RuO_2$. The surface-modified samples exhibit much improved electrochemical performances, particularly the 1 wt. % $Al_2O_3$+1 wt. % $RuO_2$ coated sample exhibits the highest discharge capacity and rate capability. The drawback is that one of the surface modifiers in the present study i.e, $RuO_2$ is very expensive and the synergistic effect of $Al_2O_3$ and $RuO_2$ is only advantageous. Reference may be made to Y. Jung, A. S. Cavanagh, A. C. Dillon, M. D. Groner, S. M. George, S.-H. Lee, J. Electrochem. Soc., 157(2010) A75-A81, wherein Atomic Layer Deposition (ALD) has been used to prepare pinhole-free surface coating layers on $LiCoO_2$ cathode material with precise control on the thinness of the coating layer down to 0.1 nm. Recently, Lee et al also reported that 2-6 atomic layers of $Al_2O_3$ coating significantly improved the capacity retention of $LiCoO_2$. However, thicker coating resulted in dramatic interfacial impedance increase and hence deteriorated the electrochemical performance of the $LiCoO_2$. The drawbacks are ALD process (Atomic Layer Deposition) is not cost effective and requires special expertise to have a control over the thickness of coated film.

Reference may be made to A. Manthiram et al. surface and bulk modified high capacity layered oxide cathodes with low irreversible capacity loss, U.S. Pat. No. 7,678,503B2 wherein, the invention provides a method of modifying a layered oxide $(1-x)Li[Li_{1/3}Mn_{2/3}]O_{2-x}Li[Mn_{0.5-y}Ni_{0.5-y}Co_{2y}]O_2$ cathode with metal oxides. Herein, the irreversible capacity loss decreases from 75 to 41 mAh $g^{-1}$ and the discharge capacity increases from 253 to 285 mAh $g^{-1}$ after surface modification in the case of $Li[Li_{0.2}Mn_{0.54}Ni_{0.13}Co_{0.13}]O_2$. Similarly, irreversible capacity loss decreases from 63 to 38 mAh $g^{-1}$ and the discharge capacity increases from 227 to 250 mAh $g^{-1}$ in the case of $Li[Li_{0.2}Mn_{0.54}Ni_{0.13}Co_{0.13}]O_2$. In contrast, while the irreversible capacity loss decreases significantly from 60 to 30 mAh $g^{-1}$, the capacity increases only slightly from 249 to 254 mAh $g^{-1}$ in the case of the cobalt-free $Li[Li_{0.17}Mn_{0.58}Ni_{0.2}]O_2$ cathode. Thus the surface modification offers the advantage of increasing the discharge capacity significantly. All the surface modifications reduce the irreversible capacity loss. The drawback is that the irreversible capacity loss observed even after surface modification was above 30 mAh $g^{-1}$, which is high.

As it is well known that the performance of a lithium-ion battery has a major dependence on the electrochemical performance of cathode material (cathode-limited battery system), need to improve the performance of battery active cathode materials assumes greater importance. The best and easiest way to improve the performance of a cathode is to modify the surface of the cathode, especially with respect to oxide and phosphate analogs of carefully chosen metals. $ABO_2$ oxides in general have greater tendency to dissolve in the non-aqueous electrolyte medium and suffer from inferior chemical and/or structural stability, cation-mixing originated off-stoichiometry and lack of hexagonal ordering. Poor cycling stability at extended potential windows above 4.5 V is yet another prime issue that needs to be addressed by suitable modification techniques. Method of surface modification, type, nature, amount and ratio of modifier as a function of pristine cathode matrix, temperature, dwell time, mode (in-situ or ex-situ) of addition and the required type of modification (perfect coating/continuous/discreate coating) are certain parameters, which are to be considered in line with the requisites to improve the electrochemical performance of a cathode using surface modification. Above all, the cathode being selected for modification plays a significant role, wherein properties of the cathode material are better judged by the type of synthesis method adopted, type and ratio of precursors chosen, mode of furnace heating, dwell time, pre- and/or post treatment protocols and synthesis methodology based additives deployed to improve the reaction efficiency of the synthesis approach.

The intriguing point is that the $LiNi_{0.4}Mn_{0.4}Co_{0.2}O_2$ (442) cathode has not been studied in detail for the possible extent of improvement in electrochemical properties. Certain modifiers, viz $Al_2O_3$, ZnO, MgO, $SnO_2$, $TiO_2$ and $ZrO_2$ have been discussed so far in the literature, that too with similar category $ABO_2$ oxide cathodes with an exception of 442 compound. Therefore, $M_xO_y$, wherein M represents any one of the metals such as Cr, Zn, Bi, Al, In, Mg and Zr are introduced for the first time as surface modifiers with $LiNi_{0.4}Mn_{0.4}Mn_{0.4}O_2$ (442) powder. The select oxides impart the desired Hydrofluoric Acid (HF) scavenging effect, suppressed phase transition and combat the blocking of certain active sites that serve as catalytic sites for electrolyte decomposition. Particularly, $Al_2O_3$, $Bi_2O_3$ and $In_2O_3$ additives demonstrate themselves as suitable surface modifiers, with a special reference to 442 cathode.

The HF scavenging effect of $Al_2O_3$, $Bi_2O_3$, $In_2O_3$ or $M_xO_y$ as per the mechanism given below has been found to be better in a way that the normally observed capacity loss is minimized with the above mentioned coating.

$$Al_2O_3 + 6HF \rightarrow 2AlF_3 + 3H_2O \quad (1)$$

$$Bi_2O_3 + 6HF \rightarrow 2BiF_3 + 3H_2O \quad (2)$$

$$In_2O_3 + 6HF \rightarrow 2InF_3 + 3H_2O \quad (3)$$

$$Cr_2O_3 + 6HF \rightarrow 2CrF_3 + 3H_2O \quad (4)$$

$$ZrO_2 + 4HF \rightarrow ZrF_4 + 2H_2O \quad (5)$$

$$ZnO + 2HF \rightarrow ZnF_2 + H_2O \quad (6)$$

$$MgO + 2HF \rightarrow MgF_2 + H_2O \quad (7)$$

$$O_y + nHF \rightarrow xMF_{n/x} + yH_2O \quad (8)$$

Further the number of oxide ion vacancies that remains after first charging has been increased in a favorable manner due to which the initial irreversible capacity loss is minimized significantly in the current investigation. In presence of HF scavenger, which is in general a Lewis base, part of HF in the electrolyte will be neutralized and the acidity of the electrolyte will be reduced. In other words, residual HF in the electrolyte will preferentially react with the added HF scavenger and hence delay the corrosion of cathode electrode materials in the acidic electrolyte. Therefore, one can reasonably expect that the addition of HF scavenger would improve the capacity retention of lithium-ion cells for a relatively short time, as widely reported in the literature. Meanwhile, the metal fluorides as byproducts of reactions 1-8 are generally insoluble in the non-aqueous electrolytes and potentially act as another protective layer to suppress the corrosion of cathode materials. In short, the active $LiNi_{0.4}Co_{0.4}Mn_{0.4}O_2$ cathode surface is totally protected from the undesirable side reactions, facilitated mainly by the HF scavenging effect of metal oxide $(M_xO_y)$ modifier. Similarly, unlike the reported synthesis methods such as solid-state, combustion and sol-gel, Cetyl Trimethyl Ammonium Bromide (CTAB) co-assisted sol-gel method has been explored for the first time to prepare 442 compound. Further, synergistic effect of synthesis method and the role of select modifiers in improving the electrochemical properties of 442 compound in terms of improved specific capacity, high rate capability, high voltage stability, reduced irreversible capacity behavior have been investigated in detail for demonstration and recommendation of the same for application in rechargeable lithium batteries.

Technical problem to be solved by Invention is that the layered $LiNi_{0.4}Mn_{0.4}Co_{0.2}O_2$ (442), belonging to a solid solution series of $LiNi_yMn_yCo_{1-2y}O_2$ has been surface modified by $M_xO_y$ type of metal oxide modifier to combat the initial irreversible capacity loss issue, qualify the cathode for high voltage and high rate application.

OBJECTIVES OF THE INVENTION

The main objective of the present invention is to provide surface modified $LiNi_{0.4}Mn_{0.4}Co_{0.2}O_2$ cathode (442) with improved lithium intercalation behaviour. Another objective of the present invention is to provide surface modifiers with a general formula $M_xO_y$, wherein, M represents at least one of the metal such as Cr, Zn, Bi, Al, In, Mg and Zr; wherein x and y are the valency of oxygen and chosen metal respectively.

Still another objective of the present invention is to provide a method for preparing the cathode and modify the surface subsequently using suitable modifiers.

BRIEF DESCRIPTION OF THE DRAWINGS

FIG. 8 (a) Comparison of rate capability of pristine $LiNi_{0.4}Mn_{0.4}Co_{0.2}O_2$ cathode with $Al_2O_3$, $Bi_2O_3$, $In_2O_3$ and $ZrO_2$ coated $LiNi_{0.4}Mn_{0.4}Co_{0.2}O_2$ cathode at different C rates; (b) Cyclability of $Al_2O_3$, $Bi_2O_3$, $In_2O_3$ and $ZrO_2$ coated $LiNi_{0.4}Mn_{0.4}Co_{0.2}O_2$ cathode at 3 C rate.

SUMMARY OF THE INVENTION

Accordingly, present invention provides surface modified $LiNi_{0.4}Mn_{0.4}Co_{0.2}O_2$ cathode powder comprising 95 to 99 wt % $LiNi_{0.4}Mn_{0.4}Co_{0.2}O_2$ cathode powder and 1 to 5 wt. % metal oxide modifiers coated on the surface of cathode powder.

In an embodiment of the present invention, metal oxide modifiers are selected from the group consisting of $Al_2O_3$, $Bi_2O_3$, $In_2O_3$, $Cr_2O_3$, $ZrO_2$, and MgO.

In another embodiment of the present invention, said cathode powder exhibits appreciably high initial and steady-state cycling capacity of 196 and 175 mAh g-1 respectively with 89% capacity retention at C/10 rate with a special reference to $Bi_2O_3$ coated 442 cathode.

In yet another embodiment of the present invention, surface modified $LiNi_{0.4}Mn_{0.4}Co_{0.2}O_2$ cathode powder exhibits appreciable capacity of $\geq 140$ mAh g$^{-1}$ at 1 C and $\geq 95$ mAh g$^{-1}$ at 3 C rate with a capacity retention $\geq 85\%$.

In yet another embodiment of the present invention, the thickness of metal oxide modifiers is in the range of 1-10 nm.

In yet another embodiment, present invention provides a process for the preparation of surface modified $LiNi_{0.4}Mn_{0.4}Co_{0.2}O_2$ cathode powder comprising the steps of:
i. dissolving $LiCOOCH_3 \cdot 2H_2O$, $(CH_3COO)_2Ni \cdot 4H_2O$, $(CH_3COO)_2Mn \cdot 4H_2O$, and $(CH_3COO)_2Co \cdot 4H_2O$ in 1:0.4:0.4:0.2 molar concentration respectively in water with stirring to get a homogeneous solution;
ii. adding 0.01M Cetyl Trimethyl Ammonium Bromide (CTAB) surfactant in the homogenous solution as obtained in step (i) with stirring followed by adding 1M citric acid as chelating agent to obtain a solution;
iii. adding 0.05N ammonium hydroxide solution in the solution as obtained in step (ii) to precipitate the respective metal oxide (insitu formation) by adjusting the pH value of the solution between 8.5 to 9 followed by stirring and heating at temperature in the range of 70 to 80° C. continued to get a transparent gel;
iv. heating the gel as obtained in step (iii) at temperature in the range of 120 to 350° C. followed by calcination at temperature in the range of 500 to 900° C. to obtain $LiNi_{0.4}Mn_{0.4}Co_{0.2}O_2$ powder;
v. adding 95 to 99% of the $LiNi_{0.4}Mn_{0.4}Co_{0.2}O_2$ powder in water with a solution of 1-5 wt. % metal salt precursor followed by adding 0.01 to 0.05N ammonium hydroxide to obtain solution containing $LiNi_{0.4}Mn_{0.4}Co_{0.2}O_2$ powder and in-situ formed metal oxide ($Al_2O_3$) precipitate;
vi. evaporating the solution as obtained in step (v) at temperature in the range of 60 to 80° C. to obtain dried powder;
vii. heating the dried powders as obtained in step (vi) at temperature in the range of 450 to 550° C. for a period in the range of 1 to 8 h to obtain surface modified $LiNi_{0.4}Mn_{0.4}Co_{0.2}O_2$ cathode powder.

In yet another embodiment of the present invention, metal salt used is metal nitrate for Al, In and Cr metal acetate for Bi, Zr, Zn and Mg.

In yet another embodiment of the present invention, chelating agent used is citric acid.

DETAILED DESCRIPTION OF THE INVENTION

Present invention provides surface modified cathodes (that belong to a solid solution of $LiNi_yMn_yCo_{1-2y}O_2$ cathode) and a comparison of their electrochemical performance before and after surface modification which illustrates the superiority of surface modified 442 cathode in exhibiting better electrochemical performance. Surface modification in the present case is found to impart the desired HF scavenging effect, suppressed phase transition and blocked certain active sites that serve as catalytic sites for electrolyte decomposition due to which the chosen 442 cathode modified with $M_xO_y$ additives (M represents at least one of the metals, viz. Cr, Zn, Bi, Al, In, Mg and Zr; and the x=valency of oxygen and hence it is 2; y=valency of chosen metal and hence it may be 2 or 3 that exhibits improved electrochemical behavior, thus leaving scope to recommend the set of oxides as possible and suitable surface modifiers.

More interestingly, $LiNi_{0.4}Co_{0.4}Mn_{0.4}O_2$ cathode has not been investigated for the possible extent of improvement in electrochemical properties till date. Commonly reported surface modifiers, viz. $Al_2O_3$, ZnO, MgO, $SnO_2$, $TiO_2$ and $ZrO_2$ have also been discussed so far in the literature with respect to layered cathode series and not with the currently chosen 442 compound. Herein, $M_xO_y$ oxides are introduced for the first time as surface modifiers in the place of CNT. Because CNT is the only modifier, which is reported in the literature as far as the 442 compound is concerned. Similarly, unlike the reported synthesis methods such as solid-state, combustion and sol-gel, CTAB co-assisted sol-gel method has been explored for the first time to prepare 442 compound. Further, synergistic effect of synthesis method and the role of select modifiers in improving the electrochemical properties of 442 compound in terms of improved specific capacity, high rate capability, high voltage stability, reduced irreversible capacity behavior have been investigated in detail for demonstration and recommendation of the same for application in rechargeable lithium batteries. Lithium-ion cells fabricated with the surface modified layered oxide cathodes described here can be used for portable electronic devices, hybrid electric vehicles and electric vehicles. In addition to providing high capacity, these cathodes significantly reduce the cost and offer improved safety even beyond 4.5 V limit.

Accordingly, the present invention provides improved lithium intercalation behavior of $LiNi_{0.4}Mn_{0.4}Co_{0.2}O_2$ cathode with novel surface modifiers, which comprises the chosen 442 cathode modified with $M_xO_y$ type of metal oxide modifiers in an optimum concentration and heating temperature along with desired coating thickness exhibits improved electrochemical behavior, thus leaving scope to recommend the set of oxides as possible and suitable surface modifiers of the invention in the broadest possible terms within which the invention will work.

$LiNi_{0.4}Mn_{0.4}Co_{0.2}O_2$ (442) cathode was surface modified by mechanothermal process. Novel surface modifiers with a general formula $M_xO_y$, where, M represents at least one of the metal such as Al, Bi, In, Cr, Zr, Zn, Mg and have been deployed to improve the intercalation/de-intercalation process.

The process for the preparation of surface modified $LiNi_{0.4}Mn_{0.4}Co_{0.2}O_2$ cathode comprising the steps of:
  i. dissolving the starting stoichiometric ratio of high purity starting materials, viz. 10.202 g of $LiCOOCH_3.2H_2O$, 9.9536 g of $(CH_3COO)_2Ni.4H_2O$, 9.8036 g of $(CH_3COO)_2Mn.4H_2O$, and 4.9816 g of $(CH_3COO)_2Co.4H_2O$ in the 1:0.4:0.4:0.2 molar concentration respectively in water with stirring to get a homogeneous solution;
  ii. addition of 10 ml of 0.01M Cetyl Trimethyl Ammonium Bromide (CTAB) surfactant with stirring followed by adding 3.2 g of 1M citric acid as chelating agent;
  iii. addition of 0.05N ammonium hydroxide solution to precipitate the respective metal oxide (insitu formation) by adjusting the pH value of the solution between 8.5 to 9 and the process of stirring and heating at 80° C. continued to get a transparent gel;
  iv. heating the gel at temperature in the range of 120 to 350° C. followed by higher calcination at 500 to 900° C. to obtain $LiNi_{0.4}Mn_{0.4}Co_{0.2}O_2$ powder;
  v. treating the $LiNi_{0.4}Mn_{0.4}Co_{0.2}O_2$ powder in water with a solution of 1-5 wt. % metal salt precursorsay metal salt used is metal nitrate for Al, In and Cr metal acetate for Bi, Zr, Zn and Mg with the addition of 0.01 to 0.05N ammonium hydroxide to precipitate the respective metal oxide ($M_xO_y$) coated 442 compound;
  vi. evaporating the solution as obtained in step (V) at temperature in the range of 60 to 80° C. to obtain dried powder;
  vii. heating the as obtained dried powders at temperature in the range of 450 to 550° C. for a period in the range of 1 to 8 h to obtain surface modified $LiNi_{0.4}Mn_{0.4}Co_{0.2}O_2$ cathode powder.
  viii. The electrode was prepared by mixing 80 wt. % active material with 10 wt. % super P carbon and 10 wt. % PVdF (Poly vinylidene fluoride) binder and made as a slurry with NMP (N-Methylpyrrolidone) solvent, coated on an Al foil and hot pressed to ensure better adherence of 120 μm thick and cut into circular electrodes of 0.64 cm² area. The CR2032 coin cells were assembled with the fabricated cathodes, lithium foil anode, 1 M $LiPF_6$ in ethylene carbonate/diethyl carbonate (EC/DEC) as electrolyte, and Celgard separator. The crimp sealed cells were subjected to electrochemical characterization studies.

The surface modifiers viz., conventionally used $Al_2O_3$ (exploited with other layered oxide cathodes and not with 442) [Ref: L. A Riley, S. Van Atta, A. S. Cavanagh, Y. Yan, S. M. George, P. Liu, A. C. Dillon, S. H. Lee, J. Power Sources, 196 (2011) 3317; Y. Kim, H. S. Kim, S. W. Martin. Electrochim. Acta, 52 (2006) 1316] and few other novel modifiers such as $M_xO_y$, wherein, M represents at least one of the metals such as Al, Bi, In, Cr, Zr, Zn and Mg have been chosen to modify the surface of native $LiNi_{0.4}Mn_{0.4}Co_{0.2}O_2$ (442) compound and the effect of individual metal oxide in improving the electrochemical performance of 442 cathode has been studied in detail. A comparison of extent of improvement observed with respect to individual surface modifier has been made as a function of irreversible capacity loss, specific capacity, cycling stability at extended voltage limits and rate capability, which is the significance of the current study.

Figure 1:
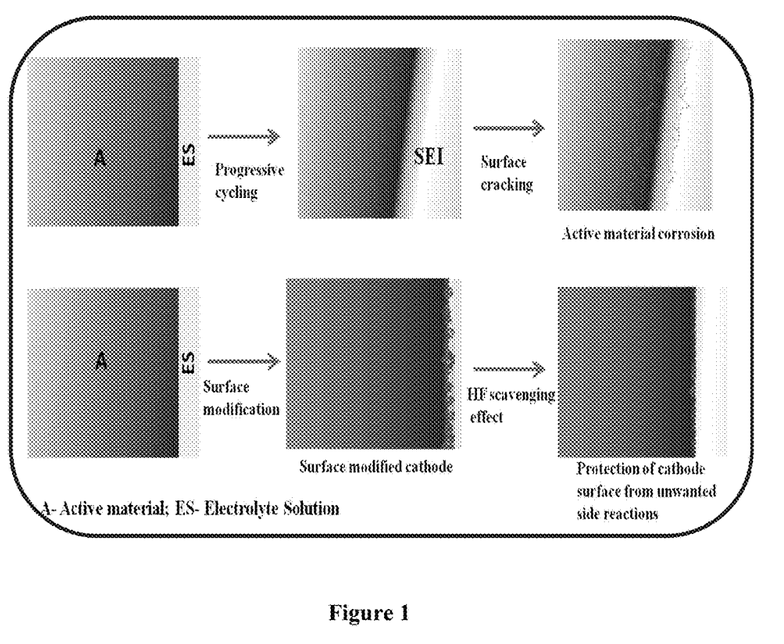
FIG. 1 represents surface coated $LiNi_{0.4}Mn_{0.4}Co_{0.2}O_2$ by $M_xO_y$ type of metal oxide modifiers.

FIG. 1 summaries the beneficial effect of the surface modification of cathode against the undesirable side reactions with the electrode/electrolyte interaction due to extended cycling. Generally, layered oxide cathodes suffer from huge irreversible capacity loss of the first charge-discharge cycle and poor rate capability. The unavoidable extraction of part of lithium as $Li_2O$, complete elimination of oxide ion vacancies that are formed during initial charging of cathode and formation of thick SEI (Solid Electrolyte Interface) layer on the cathode surface, especially upon high voltage charging are reported to be the reasons of aforesaid problems. One possible strategy to reduce the irreversible capacity loss ($C_{irr}$) is the surface modification of cathodes that can suppress the fast elimination of oxide ion vacancies and significantly reduce the contact between the active material and electrolyte. Basically, surface modification imparts HF scavenging effect, suppresses phase transition, blocks certain active centre that serve as catalytic sites for electrolyte decomposition, postpones surface aging during prolonged cycling, increases surface area and electrical conductivity, enhances thermal stability and safety depending upon the type of modifier chosen for the study. Herein, particle size, coating thickness, heating temperature of coating etc. play vital role, as the effect of each parameter is reported to cause significant change in the extent of improvement.

TABLE 1

Physical parameters of unmodified $LiNi_{0.4}Mn_{0.4}Co_{0.2}O_2$ and surface modified $LiNi_{0.4}Mn_{0.4}Co_{0.2}O_2$ compounds using $Al_2O_3$, $Bi_2O_3$ and $In_2O_3$, $Cr_2O_3$, $ZrO_2$, ZnO and MgO were calculated from XRD

| Compounds | a(Å) | c (Å) | c/3a | $I_{(003)}/I_{(104)}$ | R factor $[(I_{(006)} + I_{(102)})/I_{(101)}]$ |
| --- | --- | --- | --- | --- | --- |
| Bare | 2.86 | 14.20 | 1.65 | 1.34 | 1.38 |
| $Al_2O_3$ coated | 2.85 | 14.17 | 1.65 | 1.36 | 1.39 |
| $Bi_2O_3$ coated | 2.86 | 14.18 | 1.64 | 1.35 | 1.40 |
| $In_2O_3$ coated | 2.85 | 14.18 | 1.642 | 1.35 | 1.40 |
| $Cr_2O_3$ coated | 2.85 | 14.16 | 1.65 | 1.35 | 1.41 |
| $ZrO_2$ coated | 2.84 | 14.17 | 1.66 | 1.34 | 1.42 |
| ZnO coated | 2.84 | 14.18 | 1.65 | 1.35 | 1.42 |
| MgO coated | 2.85 | 14.18 | 1.65 | 1.34 | 1.42 |

Figure 2:
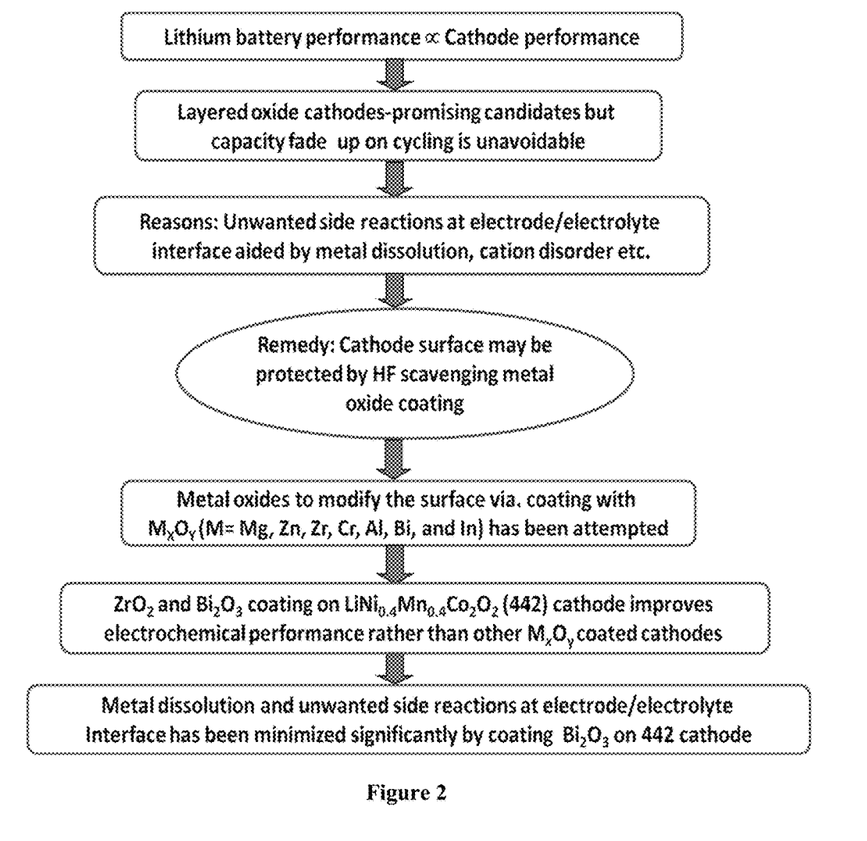
FIG. 2 represents glimpse of problem solved by the current invention.
Figure 3:
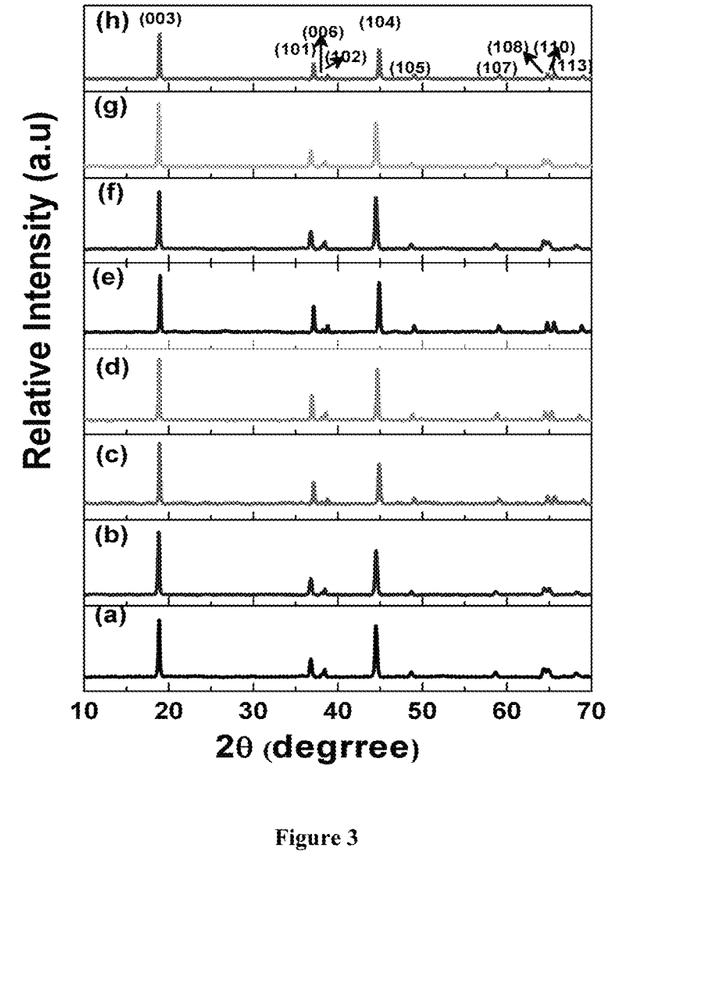
FIG. 3 represents XRD pattern recorded for (a) $LiNi_{0.4}Mn_{0.4}Co_{0.2}O_2$ (442) (b) $Al_2O_3$ coated (c) $Bi_2O_3$ coated (d) $In_2O_3$ coated (e) $Cr_2O_3$ coated (f) $ZrO_2$ coated (g) ZnO coated and (h) MgO coated $LiNi_{0.4}Mn_{0.4}Co_{0.2}O_2$.

FIG. 2 corresponds to the specific problem solved by the invention. The currently chosen $LiNi_{0.4}Mn_{0.4}Co_{0.2}O_2$ (442) has been prepared by a novel surfactant co-assisted sol-gel method using CTAB and modified further with a series of $M_xO_y$ modifiers, wherein M=Cr, Zn, Bi, Al, In, Mg and Zr;

FIG. 3 summaries the XRD behavior exhibited by pristine and surface modified 442 compounds. Presence of phase pure and crystalline $LiNi_{0.4}Mn_{0.4}Co_{0.2}O_2$ compound and the absence of undesirable impurities along with the native and/or surface modified $LiNi_{0.4}Mn_{0.4}Co_{0.2}O_2$ compound are evident from the XRD pattern shown in FIG. 3. The calculated lattice parameter values (Table 1) show excellent agreement with the reported ones, thus substantiating the effect of CTAB co-assisted sol-gel method in synthesizing a wide variety of 442 based compounds.

Figure 4:
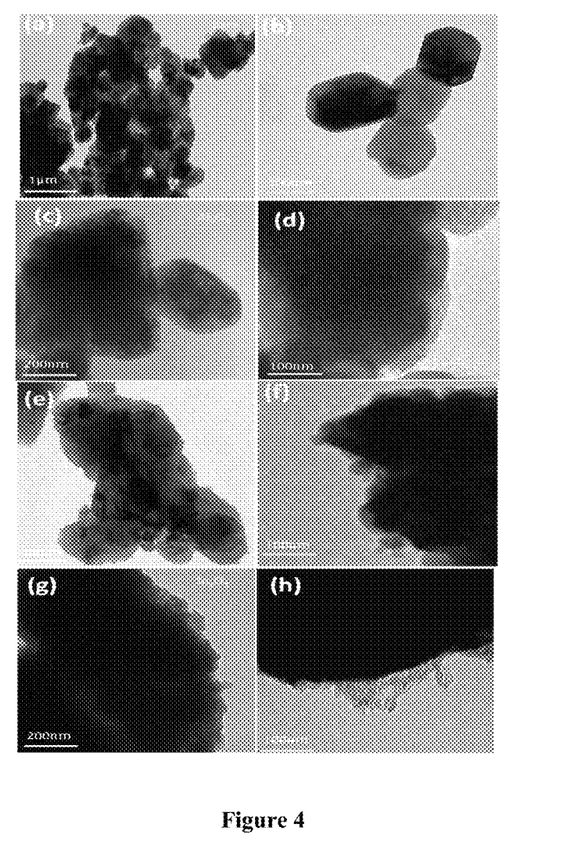
FIG. 4 represents TEM images of (a) uncoated and (b-h) metal oxide coated $LiNi_{0.4}Mn_{0.4}Co_{0.2}O_2$ compound.

FIG. 4 corresponds to the series of TEM images of <5 wt. % $Al_2O_3$, $Bi_2O_3$, and $In_2O_3$ coated and uncoated $LiNi_{0.4}Mn_{0.4}Co_{0.2}O_2$ compounds recorded at different (19 and 29K) magnifications. TEM images evidence the presence of submicron sized particles of $LiNi_{0.4}Mn_{0.4}Co_{0.2}O_2$ compound synthesized through the current attempt. The dark regions correspond to the presence of native $LiNi_{0.4}Mn_{0.4}Co_{0.2}O_2$ (442) compound and the bright ones are due to the presence of carbon coated on the surface of 442 compound. The images illustrate the presence of coating (of $Al_2O_3$, $Bi_2O_3$, and $In_2O_3$) on the surface of the highly crystalline $LiNi_{0.4}Mn_{0.4}Co_{0.2}O_2$. A minimum amount of <5 wt. % of coating material has been found to offer a desirable nanoparticle network coating with an average thickness of <5 nm (calculated using the dimension bar indication) on the surface of 442 compound. Furnace heating of coated oxide at an optimum temperature (>800° C.) and for a pre-decided calcination period (8 h.) has produced the coating of inert metal oxide with desired adherence and thickness. Unlike core shell structure, the currently synthesized metal oxide modified 442 compounds contain nano-particles of metal oxide modifier dispersed on the surface of the cathode as a rough coating, which is sufficient to address the energetically favored side reactions taking place at the electrode electrolyte interface. Such a rough coating may not impede the process of lithium diffusion during cycling, while protecting the surface of the material. As a result, improved electrochemical behavior is anticipated with $M_xO_y$ (M=Al, Bi, In, Cr, Zr, Zn and Mg) coated 442 compound.

Figure 5:
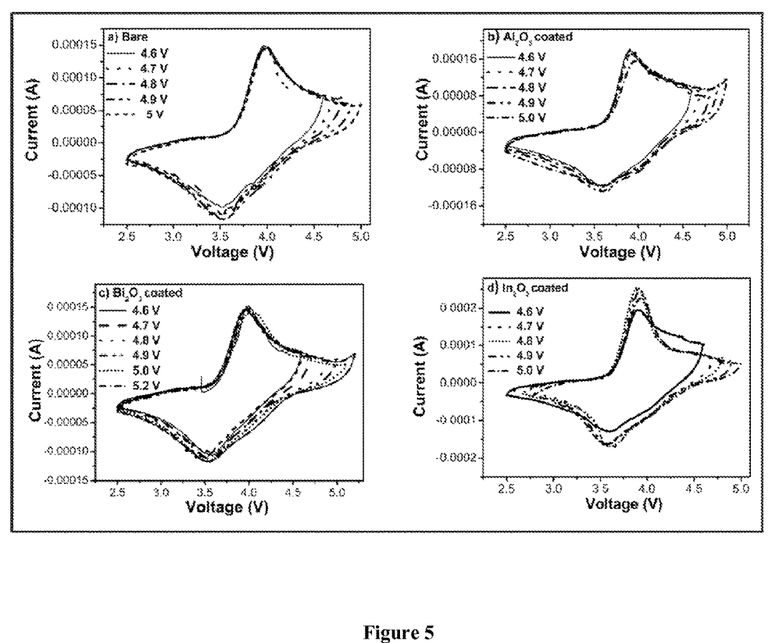
FIG. 5 represents cyclic voltammogram of (a) pristine and (b-d) metal oxide coated $LiNi_{0.4}Mn_{0.4}Co_{0.2}O_2$ cathode that can withstand a potential of 5 V, wherein FIG. 5(a) involved cathode not coated with any metal oxide, FIG. 5(b) involved cathode coated with $Al_2O_3$, FIG. 5(c) involved cathode coated with $Bi_2O_3$, and FIG. 5(d) involved cathode coated with $In_2O_3$.

FIG. 5 shows the cyclic voltammogram (CV) of bare and surface modified $LiNi_{0.4}Mn_{0.4}Co_{0.2}O_2$ cathodes recorded at a scan rate of 0.1 mV s$^{-1}$ and at different upper cut-off voltage limits ranging from 4.6 to 5.2 V, which in turn provides information to understand the effect and extent of individual metal oxide coating in improving the structural and cycling stability, especially upon extended voltage limits (>4.6 V). Herein, red-ox peaks observed at 3.97 (less pronounced) and 3.53 V correspond to $Ni^{2+}/Ni^{4+}$ pair. $Mn^{4+}$ is an electrochemically inactive state and so no CV signal is seen due to the same. From the figure, it is evident that shift in CV peak position at 3.5 V is significant for pristine $LiNi_{0.4}Mn_{0.4}Co_{0.2}O_2$ cathode (FIG. 5a), especially under the condition of high voltage cycling beyond 4.6 V. On the other hand, better overlapping of red-ox peaks has been noticed with metal oxide coated $LiNi_{0.4}Mn_{0.4}Co_{0.2}O_2$ cathodes, even upon cycling up to 5.0 V limit (FIGS. 5b-d). Surprisingly, $Bi_2O_3$ coated $LiNi_{0.4}Mn_{0.4}Co_{0.2}O_2$ exhibits appreciable structural stability and excellent reversibility up to 5.2 V, which is noteworthy. Probably, $Bi_2O_3$ nanoscale surface interconnect by way of addressing the surface repairing process of 442 cathode upon cycling has improved the structural stability to an extent of 5.2 V, which is superior than the individual effect of $Al_2O_3$ and $In_2O_3$ coating (considered as typical examples) in the 5.0 V limit.

TABLE 2

Comparison of performance improved surface modified $LiNi_{0.4}Mn_{0.4}Co_{0.2}O_2$ cathodes

| Compound | Observed $Q_{dc}$ value (mAh g$^{-1}$) as a function of cycle number | | | | Efficiency as a function of 2$^{nd}$ to 100$^{th}$ cycle (%) | |
|---|---|---|---|---|---|---|
| | Formation cycle (1$^{st}$) | 2$^{nd}$ | 10$^{th}$ | 100$^{th}$ | Retention | Coulombic efficiency |
| Bare | 233 | 211 | 193 | 138 | 65.4 | 92.0 |
| $Al_2O_3$ coated | 210 | 191 | 184 | 160 | 76.1 | 96.0 |
| $Bi_2O_3$ coated | 224 | 214 | 196 | 175 | 81.7 | 98.5 |
| $In_2O_3$ coated | 226 | 215 | 191 | 153 | 71.6 | 97.0 |
| $Cr_2O_3$ coated | 228 | 210 | 179 | 150 | 71.4 | 96.0 |
| $ZrO_2$ coated | 222 | 213 | 188 | 164 | 76.9 | 98.0 |
| ZnO coated | 226 | 212 | 189 | 149 | 70.2 | 97.0 |
| MgO coated | 229 | 216 | 188 | 147 | 68.2 | 94.0 |

Figure 6:
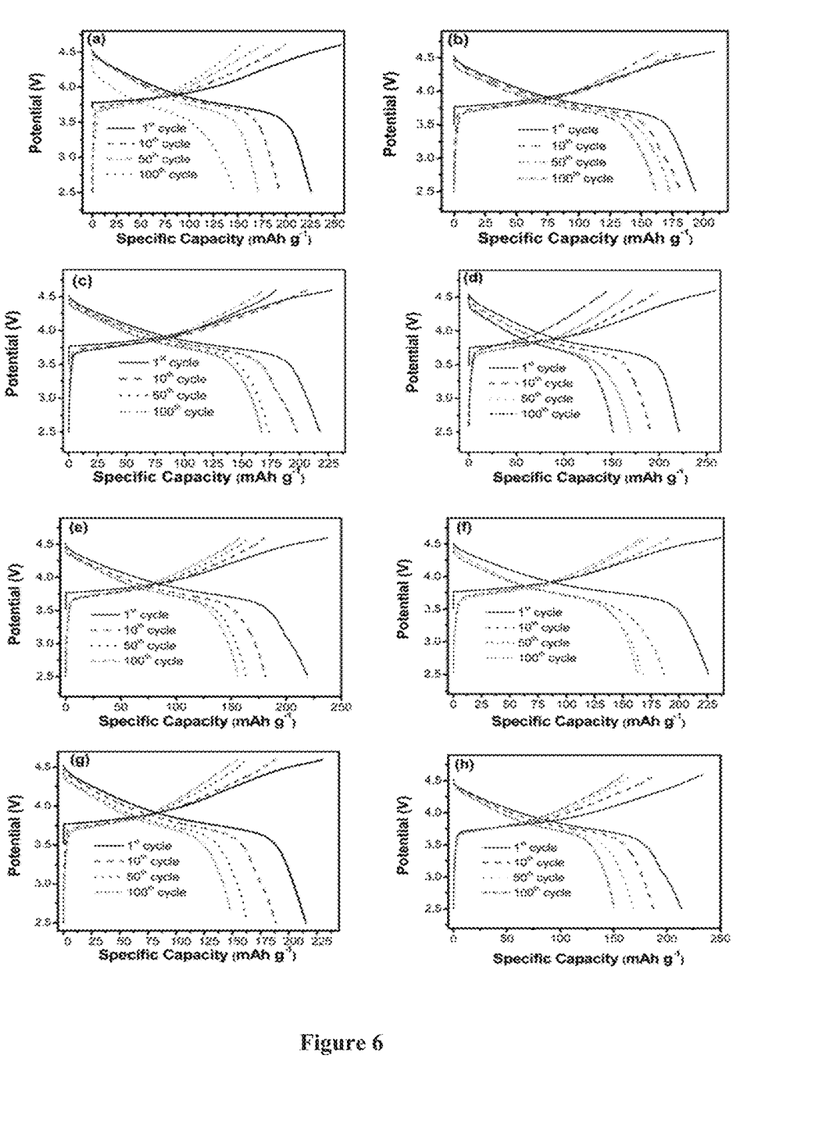
FIG. 6 represents charge-discharge behavior of (a) unmodified and (b-h) surface modified $LiNi_{0.4}Mn_{0.4}Co_{0.2}O_2$ cathode with $M_xO_y$ oxides such as $Al_2O_3$, $Bi_2O_3$, $In_2O_3$, $Cr_2O_3$, $ZrO_2$, ZnO and MgO respectively.

FIG. 6 corresponds to the charge-discharge curves of the bare and metal oxide coated $LiNi_{0.4}Mn_{0.4}Co_{0.2}O_2$ cathode derived from $Al_2O_3$, $Bi_2O_3$, $In_2O_3$, $Cr_2O_3$, $ZrO_2$, ZnO and MgO modifiers individually at a potential range of 2.5-4.6 V and the results obtained at C/10 rate. An initial specific capacity of 233 mAhg$^{-1}$ has been exhibited by bare $LiNi_{0.4}Mn_{0.4}Co_{0.2}O_2$ cathode (Table 2), where as slightly reduced initial capacity values of 210, 224, 226, 228, 222, 226 and 229 mAhg$^{-1}$ have been exhibited by $Al_2O_3$, $Bi_2O_3$, $In_2O_3$, $Cr_2O_3$, $ZrO_2$, ZnO and MgO coated $LiNi_{0.4}Mn_{0.4}Co_{0.2}O_2$ cathode respectively (FIG. 6a-h). The slight decrease in the initial specific capacity value of modified 442 cathode may be attributed to the non-conducting effect of the added inert metal oxide(s) and a possible formation of insignificant concentration of respective solid solutions as a minor phase near the surface of $LiNi_{0.4}Mn_{0.4}Co_{0.2}O_2$ cathode, as reported by Li et al. However, such a possibility of formation of solid solution is successfully overcome with the present set of compounds.

Interestingly, the initial irreversible capacity loss ($C_{irr}$) of metal oxide coated $LiNi_{0.4}Mn_{0.4}Co_{0.2}O_2$ cathodes is considerably reduced compared to the uncoated $LiNi_{0.4}Mn_{0.4}Co_{0.2}O_2$ cathode, which is quite interesting. It is important to note that unlike Armstrong et al., who have reported on the complete elimination of oxide ion vacancies formed during the initial cycling that leads to an unacceptable irreversible capacity loss behavior, Manthiram et al. have reported on the possibility of retaining part of the oxide ion vacancies in certain cathodes, to minimize the initial irreversible capacity loss problem. Since the initial irreversible capacity loss values corresponding to those of $Al_2O_3$, $Bi_2O_3$, $In_2O_3$, $Cr_2O_3$, $ZrO_2$, ZnO and MgO coated $LiNi_{0.4}Mn_{0.4}Co_{0.2}O_2$ cathode modified 442 cathodes are found to be 19, 16, 17, 20, 18, 25 and 28 mAh$^{-1}$ g against a higher irreversible capacity loss value of 30 mAh g$^{-1}$ (exhibited by the unmodified $LiNi_{0.4}Mn_{0.4}Co_{0.2}O_2$ cathode), it is understood that charge-discharge behavior and $C_{irr}$ values of metal oxide modified $LiNi_{0.4}Mn_{0.4}Co_{0.2}O_2$ cathodes of the present study are in favor of the report of Manthiram et al. As a result, appreciable discharge capacity values (FIG. 6b-d) have been exhibited by metal oxide modified $LiNi_{0.4}Mn_{0.4}Co_{0.2}O_2$ cathodes, especially upon progressive cycling (100 cycles).

Figure 7:
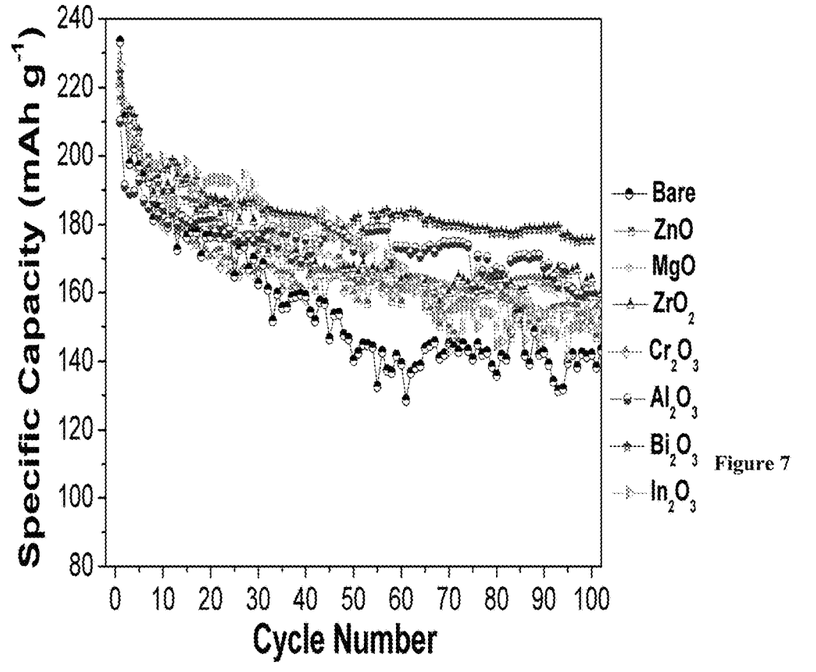
FIG. 7 represents the comparison of extended cyclability behavior of pristine $LiNi_{0.4}Mn_{0.4}Co_{0.2}O_2$ and $M_xO_y$ modified $LiNi_{0.4}Mn_{0.4}Co_{0.2}O_2$ cathodes.

FIG. 7 evidences the appreciable and extended cycle life behavior of pristine and surface modified 442 cathodes. The charge-discharge capacity of $Al_2O_3$, $Bi_2O_3$, $In_2O_3$, $Cr_2O_3$, $ZrO_2$, ZnO and MgO metal oxide coated $LiNi_{0.4}Mn_{0.4}Co_{0.2}O_2$ cathodes at a potential range of 2.5-4.6 V and at C/10 rate along with pristine 442 cathode are furnished in the figure. It is quite interesting to note that the attain stability after 10 cycles and exhibit appreciable discharge capacity values even after completing 50 and 100 cycles which is the highlight of the invention. The effective role of surface modifying inert metal oxide in suppressing the undesirable side reactions of the electrode with the electrolyte by way of offering better physical protection and the formation of SEI with desirable thickness that would aid faster diffusion of Li$^+$ ions through the interface are better understood from this study. Particularly, $Bi_2O_3$ coated $LiNi_{0.4}Mn_{0.4}Co_{0.2}O_2$ cathode exhibits a maximum capacity of 181 and 175 mAh g$^{-1}$ after 50 and 100 cycles respectively. The capacity retention (from 10th cycle to 100th) behavior of the same is also superior (89%) than the rest of the cathodes considered for investigation.

Figure 8:
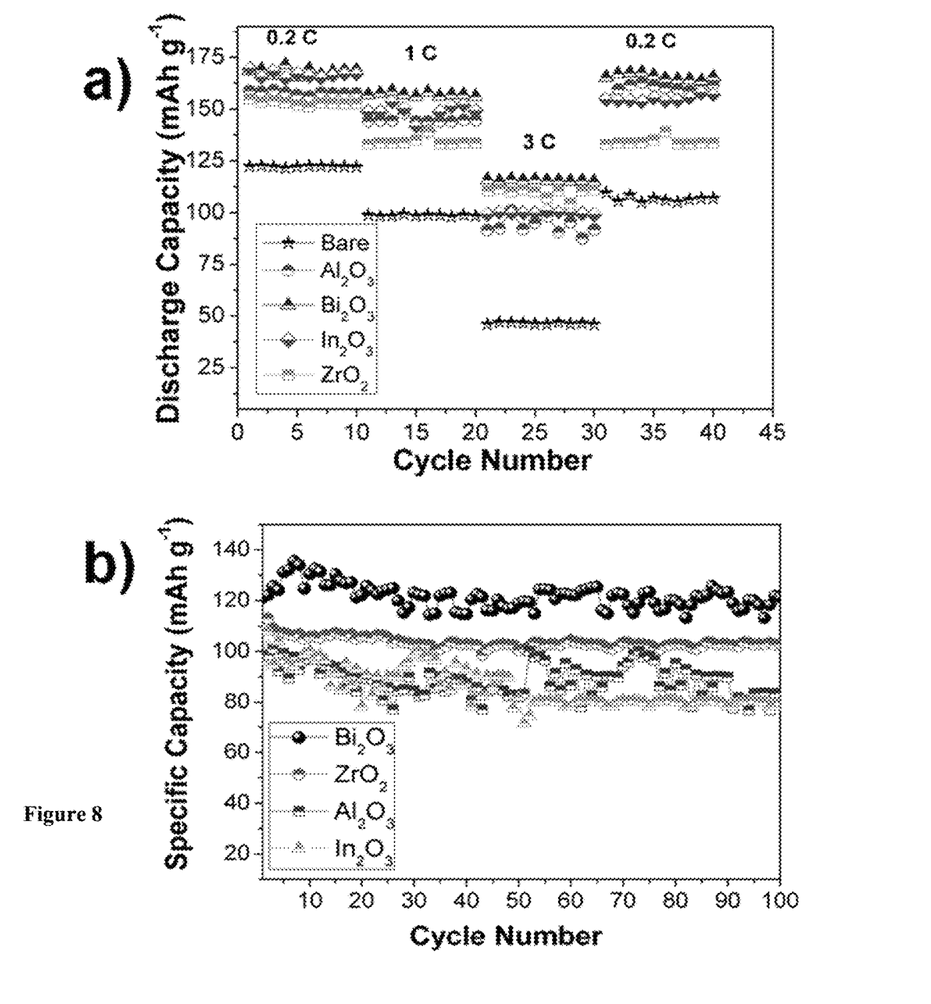

FIG. 8a deals with the rate capability behavior of bare and 2 wt. % $Al_2O_3$, $Bi_2O_3$, $In_2O_3$ and $ZrO_2$ coated $LiNi_{0.4}Mn_{0.4}Co_{0.2}O_2$ cathode at various C rates along with extended cyclability behavior of shortlisted and better performing modified cathodes at 3 C rate in FIG. 8b. It is well known that a thick or improper SEI formation at the interface would impede or interfere with lithium diffusion kinetics, especially beyond 30 cycles and under the influence of extended potential window above 4.5 V. As a result, such system will miserably fail at high rate charge-discharge conditions due to unacceptable capacity fade problem. However, a comparison of rate capability behavior of pristine $LiNi_{0.4}Mn_{0.4}Co_{0.2}O_2$, with the surface coated $LiNi_{0.4}Mn_{0.4}Co_{0.2}O_2$ cathode is encouraging. The capacity behavior has been exhibited by surface modified $LiNi_{0.4}Mn_{0.4}Co_{0.2}O_2$ cathode in such a way that nominal capacity values of 150, 158 and 140 and 155 mAh g$^{-1}$ have been observed respectively with $Al_2O_3$, $Bi_2O_3$, $In_2O_3$ and $ZrO_2$ coated $LiNi_{0.4}Mn_{0.4}Co_{0.2}O_2$ cathode compared to the lesser capacity value of 98 mAhg$^{-1}$ exhibited by pristine 442 cathode at 1 C rate. Similarly, acceptable capacity values of 100, 120, 95 and 110 mAhg$^{-1}$ have been exhibited by $Al_2O_3$, $Bi_2O_3$, $In_2O_3$ and $ZrO_2$ coated cathodes (at 3 C rate) compared to the unacceptable capacity of 45 mAhg$^{-1}$, corresponding to pristine $LiNi_{0.4}Mn_{0.4}Co_{0.2}O_2$ cathode. Hence, the suitability and advantages of metal oxide modified 442 cathodes for high rate cycling conditions could be understood.

The intended discrete coating to protect the layer of 442 cathode from undesirable parasitic side reactions and the extent of improved capacity values superior than the literature reported values are realized with the combination of adopting a suitable synthesis approach and a correspondingly compatible surface modification protocol. As a result, in addition to the anticipated HF scavenging effect, number of oxide ion vacancies eliminated during the initial cycling of cathode gets restricted and thereby considerably reduced irreversible capacity loss of the first cycle has been achieved. An appreciable specific capacity of 196 ($Q_{dc1}$) mAh g$^{-1}$ with 89% capacity retention upto 100 cycles and a steady-state capacity of 175 mAh g$^{-1}$, even after completing 100 charge/discharge cycles have been demonstrated. Hence, the larger capacity fade, observed normally with any type of modified cathodes upon extended cycling (100 cycles) has been addressed in the present case. Further, limitation of oxide cathodes against high rate applications has also been surpassed, as the $Bi_2O_3$ coated $LiNi_{0.4}Mn_{0.4}Co_{0.2}O_2$ cathode, cycled at 3 C rate for 100 cycles is found to be stable even at a high voltage of 5.2 V.

Scientific explanations are Parasitic side reactions of the cathode active material viz., 442 to form and/or to react with HF, initial irreversible capacity issue of native cathodes, capacity fade observed upon progressive cycling, limitations for use in high rate and high voltage applications are solved by the current invention. The synergistic effect of CTAB co-assisted sol-gel synthesis and the role of surface modifiers ($M_xO_y$ and $Bi_2O_3$ especially) has been demonstrated to improve the electrochemical behavior of 442 cathode, which is again a novelty. Apart from the demonstration of suitability of chosen surface modifiers in qualifying pristine $LiNi_{0.4}Mn_{0.4}Co_{0.2}O_2$ cathode for high rate applications, the superiority of $Bi_2O_3$ coating in improving the electrochemical behavior of 442 cathode is further substantiated from the steady-state capacity behavior of 120 mAh g$^{-1}$ observed at 3 C conditions and up to 100 cycles. Further, the order of $Bi_2O_3$ coated >$ZrO_2$ coated >$Al_2O_3$>$In_2O_3$ coated >$Cr_2O_3$>ZnO>MgO>unmodified pristine 442 cathode as a function of electrochemical behavior could be validated and better understood from the rate capability behavior.

EXAMPLES

The following examples are given by way of illustration and therefore should not be construed to limit the scope of the present invention.

Example 1

Preparation of $LiNi_{0.4}Mn_{0.4}Co_{0.2}O_2$ (442) Cathode

[Ref: D. Bhuvaneswari, Gangulibabu, N. Kalaiselvi, *J Solid State Electrochemistry* (2013) 17:9-17] $LiNi_{0.4}Mn_{0.4}Co_{0.2}O_2$ (442) cathode was synthesized by adopting surfactant co-assisted sol-gel synthesis approach using citric acid as chelating agent. Stoichiometric ratios of high purity starting materials 10.202 g of $LiCOOCH_3.2H_2O$, 9.9536 g of $(CH_3COO)_2Ni. 4H_2O$, 9.8036 g of $(CH_3COO)_2Mn.4H_2O$, and 4.9816 g of $(CH_3COO)_2Co. 4H_2O$ in the molar concentration of 1:0.4:0.4:0.2 were dissolved in water with stirring to get a homogeneous solution. To the solution, an optimum amount of 10 ml of 0.01M concentration of CetylTrimethyl Ammonium Bromide (CTAB) surfactant was added dropwise with stirring. Followed by this, an optimized amount 3.2 g of 1M of citric acid as chelating agent was added. Further, 0.05N ammonium hydroxide solution was added up to adjust the pH value of 9 and the process of stirring and heating at 80° C. was continued to get a transparent gel. The gel thus obtained after aging was furnace-heated to 350° C. followed by higher calcination at 900° C. using alumina crucibles. $LiNi_{0.4}Mn_{0.4}Co_{0.2}O_2$ powders obtained after 900° C. were ground and subjected to characterization studies.

Example 2

Preparation of Surface Modified $LiNi_{0.4}Mn_{0.4}Co_{0.2}O_2$ (442) Cathode

Fine dispersion of 1 g of 442 powder in 100 ml of water was treated individually with a solution of 0.6 M concentration of aluminium nitrate solution at different weight percentage (1-5 wt. %) followed by the addition of 0.05N ammonium hydroxide to precipitate the $Al_2O_3$ (insitu formation). The solution containing 442 compound and in-situ formed metal oxide ($Al_2O_3$) was evaporated slowly at 80° C. and the dried powder was collected. The 442 compound surface modified with 1-5 wt. % of $Al_2O_3$ coating concentration was subjected to furnace calcination individually at 500° C. in air for 8 h to obtain $Al_2O_3$ coated $LiNi_{0.4}Mn_{0.4}Co_{0.2}O_2$ compound.

Example 3

Surface modification with $In_2O_3$ was carried out by adopting the same procedure mentioned in example-2 by taking the metal precursor, viz., indium nitrate 0.6M at different weight percentage (1-5 wt. %) followed by the addition of 0.05N ammonium hydroxide to precipitate the metal hydroxide (insitu formation). The 442 compound surface coated with 1-5 wt. % of $In_2O_3$ was subjected to furnace calcination individually at 550° C. in air for 8 h to obtain $In_2O_3$ coated $LiNi_{0.4}Mn_{0.4}Co_{0.2}O_2$ compound.

Example 4

Surface modification with $Bi_2O_3$ was carried out by adopting the same procedure mentioned in example-2 by taking the metal precursor, viz., bismuth acetate 0.3M at different weight percentage (1-5 wt. %) followed by the addition of 0.05N ammonium hydroxide to precipitate the metal hydroxide (insitu formation). The 442 compound surface coated with 1-5 wt. % of $Bi_2O_3$ was subjected to furnace calcination individually at 530° C. in air for 8 h to obtain $Bi_2O_3$ coated $LiNi_{0.4}Mn_{0.4}Co_{0.2}O_2$ compound.

Example 5

Surface modification with $Cr_2O_3$ was carried out similar to that presented in example-2 by dispersing the cathode powder in 0.6M concentration of chromium nitrate precursor solution (1-5 wt. %.), followed by adding 0.05N ammonium hydroxide. The precipitate the chromium hydroxides. The 442 compound surface modified with 1-5 wt. % of $Cr_2O_3$ coating concentration was subjected to furnace calcination individually at 485° C. in air for 8 h to obtain $Cr_2O_3$ coated $LiNi_{0.4}Mn_{0.4}Co_{0.2}O_2$ compound.

Example 6

Surface modification with ZnO was carried out similar to that presented in example-2 by dispersing the cathode powder in 0.3M zinc acetate precursor solution (1-5 wt. %.), followed by adding 0.05N ammonium hydroxide to precipitate zinc hydroxide. The 442 compound surface modified with 1-5 wt. % of ZnO coating concentration was subjected to furnace calcination individually at 520° C. in air for 8 h to obtain ZnO coated $LiNi_{0.4}Mn_{0.4}Co_{0.2}O_2$ compound.

Example 7

Surface modification with, MgO was carried out similar to that presented in example-2 by dispersing the cathode powder in 0.3M magnesium acetate precursor solution (1-5 wt. %.), followed by adding 0.05N ammonium hydroxide to precipitate magnesium hydroxide. The 442 compound surface modified with 1-5 wt. % of MgO coating concentration was subjected to furnace calcination individually at 500° C. in air for 8 h to obtain MgO coated $LiNi_{0.4}Mn_{0.4}Co_{0.2}O_2$ compound.

Example 8

Surface modification with, $ZrO_2$ metal oxide was carried out similar to that presented in example-2 by dispersing the cathode powder in the corresponding 0.6M zirconium nitrate precursor solution (1-5 wt. %.), followed by adding 0.05N ammonium hydroxide to precipitate zirconium hydroxides. The 442 compound surface modified with 1-5 wt. % of $ZrO_2$ coating concentration was subjected to furnace calcination individually at 510° C. in air for 8 h to obtain $ZrO_2$ coated $LiNi_{0.4}Mn_{0.4}Co_{0.2}O_2$ compound.

Example 9

The charge-discharge cycling study of surface modified $LiNi_{0.4}Mn_{0.4}Co_{0.2}O_2$ (442) cathode by metal oxides belonging to the family of MO, $MO_2$ and $M_2O_3$ viz., ZnO, MgO, $ZrO_2$, $Cr_2O_3$, $Al_2O_3$, $Bi_2O_3$ and $In_2O_3$:

Encouraging capacity behavior has been exhibited by surface modified $LiNi_{0.4}Mn_{0.4}Co_{0.2}O_2$ cathode in such a way that the nominal capacity values of 150, 158 and 140 and 155 mAh $g^{-1}$ have been observed respectively with $Al_2O_3$, $Bi_2O_3$, $In_2O_3$ and $ZrO_2$ coated $LiNi_{0.4}Mn_{0.4}Co_{0.2}O_2$ cathode compared to the lesser capacity value of 98 mAh $g^{-1}$ exhibited by pristine 442 cathode and rest of the surface modified 442 cathode combinations at 1 C rate. Similarly, acceptable capacity values of 100, 120, 95 and 110 mAh $g^{-1}$ have been exhibited by $Al_2O_3$, $Bi_2O_3$, $In_2O_3$ and $ZrO_2$ coated cathodes (at 3 C rate) compared to the unacceptable capacity of 45 mAh $g^{-1}$, corresponding to pristine $LiNi_{0.4}Mn_{0.4}Co_{0.2}O_2$ cathode, thus substantiating of $MO_2$ and $M_2O_3$ type metal oxides in modifying the surface of 442 cathode in a significant manner.

Conclusion of the invention is surface coating on $LiNi_{0.4}Mn_{0.4}Co_{0.2}O_2$ compounds with CNTas modifier has been reported. Till date, no attempt to exploit metal oxides ($M_xO_y$) as surface modifiers to improve the electrochemical properties of 442 cathodes has been made. Optimum concentration of metal oxide (<5 wt %) and furnace heating at 500° C. for an duration of <10 h to obtain duly coated $LiNi_{0.4}Mn_{0.4}Co_{0.2}O_2$ compound. $Bi_2O_3$ coated $LiNi_{0.4}Co_{0.4}Mn_{0.4}O_2$ cathode exhibited appreciable progressive specific capacity of 196 mAh$g^{-1}$ at 4.6 V, enabling to cycle at 3 C rate up to 100 cycles and demonstrated the stability at a high voltage at 5.2 V in the CV. The type, nature, pattern and thickness of $Bi_2O_3$ coating on the surface of 442 compound has been effectively controlled by adjusting the reaction parameters in a careful manner. Similarly, adoption of said procedure in a skillful manner also is a non-obvious inventive step as that of aforesaid thickness factor. The superiority and suitability of $Bi_2O_3$ coating in improving the electrochemical properties of $LiNi_{0.4}Mn_{0.4}Co_{0.2}O_2$ cathode to best suit with the requirements of high voltage and high rate applications of rechargeable lithium batteries has been understood with the present study. It could be extended to other layered high capacity oxide cathodes also against the undesirable side reactions with the electrolyte and the possible structural changes upon extended cycling, by way of modifying the surface using select ($M_xO_y$) additives.

Advantages of the Invention

The currently projected $Bi_2O_3$ coated 442 cathode withstands a potential limit of 5.0V upon cycling, which has never been demonstrated so far. ($Bi_2O_3$ coated 442 cathode demonstrates appreciable structural stability and better reversibility, even up to 5.2 V limit).

Partial retention of oxide ion vacancies has been demonstrated with the $Bi_2O_3$ coated 442 cathode of the present study, as understood from the minimum irreversible capacity loss values (16 and 17 mAh$g^{-1}$ against 30 mAh $g^{-1}$) exhibited by $Bi_2O_3$ and $In_2O_3$ coated 442 (in comparison with the bare 442 cathode) exhibited upon cycling process i.e., the newly incorporated surface modifier, viz., $Al_2O_3$, $Bi_2O_3$, $In_2O_3$, $Cr_2O_3$, $ZrO_2$, ZnO, MgO reduces the number of oxide ion vacancies eliminated during the initial discharge and leads to appreciable discharge capacities of 211 and 196 mAh $g^{-1}$ during second cycle, especially with respect to $Bi_2O_3$ coated cathode.

Formation and stabilization of SEI to avoid undesirable side reactions and better HF scavenging effect are understood from the appreciable specific capacity values of 181 and 163 mAh $g^{-1}$ observed at $50^{th}$ and $100^{th}$ cycles respectively.

Capacity retention of 89% has been achieved mainly due to the aforesaid advantageous effects. This observation is better than the reported capacity value of 150 mAh $g^{-1}$ with a capacity retention of 80%.

Beneficial effect of $Bi_2O_3$ in improving the rate capability behavior of 442 cathode has been demonstrated by the acceptable capacity of 120 mAh $g^{-1}$ exhibited at 3 C rate against 100 mAh $g^{-1}$ ($Al_2O_3$), 95 mAh $g^{-1}$ ($In_2O_3$) and 45 mAh $g^{-1}$ (bare 442). The steady state behavior of $Bi_2O_3$ coated 442 cathode at 120 mAh $g^{-1}$ has been demonstrated up to 100 cycles, which is also not reported in the literature (both for high rate application and for extended cycle life).

We claim:

1. A surface modified cathode comprising 95 to 99 wt. % $LiNi_{0.4}Mn_{0.4}Co_{0.2}O_2$ cathode powder and 1 to 5 wt. % metal oxide modifiers coated on the surface of the $LiNi_{0.4}Mn_{0.4}Co_{0.2}O_2$ cathode powder, wherein the metal oxide modifiers are selected from the group consisting of $In_2O_3$, $Cr_2O_3$, ZnO and MgO.

2. The surface modified cathode as claimed in claim 1, wherein the surface modified $LiNi_{04}Mn_{04}Co_{02}O_2$ cathode powder exhibits appreciable capacity of $\geq 140$ mAh $g^{-1}$ at 1 C and $\geq 95$ mAh $g^{-1}$ at 3 C rate with a capacity retention $\geq 85\%$.

3. The surface modified cathode as claimed in claim 1, wherein the thickness of the metal oxide modifiers is in a range of 1-10 nm.

4. A surface modified cathode comprising:
    $LiNi_{0.4}Mn_{0.4}Co_{0.2}O_2$ cathode powder; and
    metal oxide modifiers coated on the surface of the $LiNi_{0.4}Mn_{0.4}Co_{0.2}O_2$ cathode powder, wherein
    the metal oxide modifiers are selected from the group consisting of $Al_2O_3$, $Bi_2O_3$, $In_2O_3$, $Cr_2O_3$, $ZrO_2$, ZnO and MgO; and
    a lattice constant c of structural parameters of the surface modified $LiNi_{0.4}Mn_{0.4}Co_{0.2}O_2$ cathode powder ranges from 14.16 Å to less than 14.20 Å.

5. The surface modified cathode as claimed in claim 4, wherein said surface modified cathode powder includes $Bi_2O_3$ modifier coated on the surface of the $LiNi_{0.4}Mn_{0.4}CO_{0.2}O_2$ cathode powder and exhibits appreciably high initial and steady-state cycling capacity of 196 and 175 mAh $g^{-1}$ respectively with 89% capacity retention at C/10 rate.

6. The surface modified cathode as claimed in claim 4, wherein weight percentage of the $LiNi_{0.4}Mn_{0.4}CO_{0.2}O_2$ cathode powder is from 95 to 99 wt. % and weight percentage of the metal oxide modifiers is from 1 to 5 wt. %.

7. The surface modified cathode as claimed in claim 4, wherein the surface modified $LiNi_{04}Mn_{04}Co_{02}O_2$ cathode powder exhibits appreciable capacity of $\geq 140$ mAh $g^{-1}$ at 1 C and $\geq 95$ mAh $g^{-1}$ at 3 C rate with a capacity retention $\geq 85\%$.

8. The surface modified cathode as claimed in claim 4, wherein the thickness of metal oxide modifiers is in a range of 1-10 nm.

9. A process for the preparation of surface modified $LiNi_{0.4}Mn_{0.4}Co_{0.2}O_2$ cathode powder as claimed in claim 1 comprising the steps of:
    i. dissolving $LiCOOCH_3 2H_2O$, $(CH_3COO)_2Ni.4H_2O$, $(CH_3COO)_2Mn.4H_2O$, and $(CH_3COO)_2Co.4H_2O$ in 1:0.4:0.4:0.2 molar concentration respectively in water with stirring to get a homogeneous solution;
    ii. adding 0.01M Cetyl Trimethyl Ammonium Bromide (CTAB) surfactant in the homogenous solution as obtained in step (i) with stirring followed by adding 1M citric acid as chelating agent to obtain a solution;
    iii. adding 0.05N ammonium hydroxide solution in the solution as obtained in step (ii) to precipitate the respective metal oxide (in-situ formation) by adjusting the pH value of the solution between 8.5 to 9 followed by stirring and heating at temperature in the range of 70 to 80 ° C. continued to get a transparent gel;
    iv. heating the gel as obtained in step (iii) at temperature in the range of 120 to 350° C. followed by calcination at temperature in the range of 500 to 900° C. to obtain $LiNi_{0.4}Mn_{0.4}Co_{0.2}O_2$ powder;
    v. adding 95 to 99% of the $LiNi_{0.4}Mn_{0.4}CO_{0.2}O_2$ powder in water with a solution of 1-5 wt.% metal salt precursor followed by adding 0.01 to 0.05N ammonium hydroxide to obtain solution containing $LiNi_{0.4}Mn_{0.4}CO_{0.2}O_2$ powder and in-situ formed metal oxide ($Al_2O_3$) precipitate;
    vi. evaporating the solution as obtained in step (v) at temperature in the range of 60 to 80° C. to obtain dried powder;
    vii. heating the dried powders as obtained in step (vi) at temperature in the range of 450 to 550° C. for a period in the range of 1 to 8h to obtain surface modified $LiNi_{0.4}Mn_{0.4}Co_{0.2}O_2$ cathode powder.

10. The process as claimed in claim 9, wherein metal salt used is metal nitrate for Al, In and Cr metal acetate for Bi, Zr, Zn and Mg.

11. The process as claimed in claim 9, wherein chelating agent used is citric acid.

12. A process for the preparation of surface modified $LiNi_{0.4}Mn_{0.4}Co_{0.2}O_2$ cathode powder as claimed in claim 9 comprising the steps of:
    i. dissolving $LiCOOCH_3.2H_2O$, $(CH_3COO)_2Ni.4H_2O$, $(CH_3COO)_2Mn.4H_2O$, and $(CH_3COO)_2Co.4H_2O$ in 1:0.4:0.4:0.2 molar concentration respectively in water with stirring to get a homogeneous solution;
    ii. adding 0.01M Cetyl Trimethyl Ammonium Bromide (CTAB) surfactant in the homogenous solution as obtained in step (i) with stirring followed by adding 1M citric acid as chelating agent to obtain a solution;
    iii. adding 0.05N ammonium hydroxide solution in the solution as obtained in step (ii) to precipitate the respective metal oxide (in-situ formation) by adjusting the pH value of the solution between 8.5 to 9 followed by stirring and heating at temperature in the range of 70 to 80° C. continued to get a transparent gel;
    iv. heating the gel as obtained in step (iii) at temperature in the range of 120 to 350° C. followed by calcination at temperature in the range of 500 to 900° C. to obtain $LiNi_{0.4}Mn_{0.4}CO_{0.2}O_2$ powder;
    v. adding 95 to 99% of the $LiNi_{0.4}Mn_{0.4}CO_{0.2}O_2$ powder in water with a solution of 1-5 wt.% metal salt precursor followed by adding 0.01 to 0.05N ammonium hydroxide to obtain solution containing $LiNi_{0.4}Mn_{0.4}CO_{0.2}O_2$ powder and in-situ formed metal oxide ($Al_2O_3$) precipitate;

vi. evaporating the solution as obtained in step (v) at temperature in the range of 60 to 80° C. to obtain dried powder;

vii. heating the dried powders as obtained in step (vi) at temperature in the range of 450 to 550° C. for a period in the range of 1 to 8h to obtain surface modified $LiNi_{0.4}Mn_{0.4}CO_{0.2}O_2$ cathode powder.

13. The process as claimed in claim 12, wherein metal salt used is metal nitrate for Al, In and Cr metal acetate for Bi, Zr, Zn and Mg.

14. The process as claimed in claim 12, wherein chelating agent used is citric acid.

* * * * *